United States Patent
Ozturk et al.

(10) Patent No.: US 9,292,283 B2
(45) Date of Patent: Mar. 22, 2016

(54) METHOD FOR FAST LARGE-INTEGER ARITHMETIC ON IA PROCESSORS

(71) Applicants: Erdinc Ozturk, Marlborough, MA (US); Vinodh Gopal, Westborough, MA (US); James Guilford, Northborough, MA (US)

(72) Inventors: Erdinc Ozturk, Marlborough, MA (US); Vinodh Gopal, Westborough, MA (US); James Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 13/707,105

(22) Filed: Dec. 6, 2012

(65) Prior Publication Data

US 2014/0019725 A1  Jan. 16, 2014

Related U.S. Application Data

(63) Continuation-in-part of application No. 13/631,761, filed on Sep. 28, 2012.

(60) Provisional application No. 61/670,472, filed on Jul. 11, 2012.

(51) Int. Cl.
  *G06F 7/523* (2006.01)
  *G06F 9/30* (2006.01)
  *G06F 7/52* (2006.01)

(52) U.S. Cl.
  CPC .............. *G06F 9/3001* (2013.01); *G06F 7/52* (2013.01); *G06F 7/523* (2013.01); *G06F 9/30036* (2013.01)

(58) Field of Classification Search
  CPC ................... G06F 2207/5523; G06F 7/5277
  USPC ......... 708/606, 620, 653–714, 490, 495, 503, 708/625
  See application file for complete search history.

(56) References Cited

U.S. PATENT DOCUMENTS 3,610,906 A * 10/1971 Stampler ............... 708/625
5,373,561 A   12/1994 Haber et al.
(Continued)

OTHER PUBLICATIONS

"Public-Key Cryptography Standards (PKCS) #1: RSA Cryptography Specifications Version 2.1," by Jonsson et al., dated Feb. 2003, 72 pages.

(Continued)

*Primary Examiner* — Andrew Caldwell
*Assistant Examiner* — Calvin M Brien
(74) *Attorney, Agent, or Firm* — Blakely, Sokoloff, Taylor & Zafman LLP

(57) ABSTRACT

Methods, systems, and apparatuses are disclosed for implementing fast large-integer arithmetic within an integrated circuit, such as on IA (Intel Architecture) processors, in which such means include receiving a 512-bit value for squaring, the 512-bit value having eight sub-elements each of 64-bits and performing a 512-bit squaring algorithm by: (i) multiplying every one of the eight sub-elements by itself to yield a square of each of the eight sub-elements, the eight squared sub-elements collectively identified as T1, (ii) multiplying every one of the eight sub-elements by the other remaining seven of the eight sub-elements to yield an asymmetric intermediate result having seven diagonals therein, wherein each of the seven diagonals are of a different length, (iii) reorganizing the asymmetric intermediate result having the seven diagonals therein into a symmetric intermediate result having four diagonals each of 7×1 sub-elements of the 64-bits in length arranged across a plurality of columns, (iv) adding all sub-elements within their respective columns, the added sub-elements collectively identified as T2, and (v) yielding a final 512-bit squared result of the 512-bit value by adding the value of T2 twice with the value of T1 once. Other related embodiments are disclosed.

30 Claims, 10 Drawing Sheets

(56) References Cited

U.S. PATENT DOCUMENTS

| | | | |
|---|---|---|---|
| 6,748,410 B1* | 6/2004 | Gressel et al. | 708/491 |
| 2004/0093493 A1 | 5/2004 | Bisbee et al. | |
| 2006/0075245 A1 | 4/2006 | Meier | |
| 2007/0016785 A1 | 1/2007 | Guay et al. | |
| 2007/0106908 A1 | 5/2007 | Miyazaki et al. | |
| 2010/0293384 A1 | 11/2010 | Potkonjak | |
| 2011/0191596 A1 | 8/2011 | Brizek | |
| 2011/0283124 A1* | 11/2011 | Branover et al. | 713/323 |
| 2012/0151216 A1 | 6/2012 | Serret-Avila et al. | |
| 2013/0073864 A1 | 3/2013 | Sarkar et al. | |
| 2013/0311772 A1 | 11/2013 | Etheridge | |

OTHER PUBLICATIONS

"PKCS #1 v2.1: RSA Cryptography Standard," by RSA Laboratories dated Jun. 14, 2002, 61 pages.

"PKCS #15 v1.1: Cryptographic Token Information Snytax Standard," by RSA Laboratories dated Jun. 6, 2000, 81 pages.

"rsax_mod_exp_1024_Complete_VS" zip package, retrieved from http://www.intel.com/p/en_US/embedded/hwsw/software/crc-license?id=6336&iid=6337 on Nov. 25, 2012, 112 pages.

"New Instructions Supporting Large Integer Arithmetic on Intel® Architecture Processors," dated Aug. 2012, 16 pages.

"Speeding up Big-Numbers Squaring," from the 2012 Ninth International Conference on Information Technology, 2012, 3 pages.

Office Action for U.S. Appl. No. 13/712,401 dated Mar. 4, 2014, 14 pages.

"More problems with hash functions" by Hal Finney, dated Aug. 20, 2004, 2 pages.

"RFC 4346: The Transport layer Security (TIS) Protocol Version 1.1," by T. Dierks et al. dated 2006, 87 pages.

"Vulnerability of software integrity and code signing applications to chosen-prefix collisions for MD5," by Mark Stevens et al. dated Nov. 30, 2007, 6 pages.

Notice of Allowance for U.S. Appl. No. 13/712,401 dated Aug. 14, 2014, 7 pages.

* cited by examiner

METHOD FOR FAST LARGE-INTEGER ARITHMETIC ON IA PROCESSORS

CLAIM OF PRIORITY

This continuation-in-part application is related to, and claims priority to, the provisional utility application entitled "METHOD, SYSTEM, AND DEVICE FOR PARALLEL PROCESSING OF A SINGLE DATA BUFFER," filed on Jul. 26, 2012, having an application No. 61/670,472; and the utility application entitled "PARALLEL PROCESSING OF A SINGLE DATA BUFFER," filed on Sep. 28, 2012, having an application number of Ser. No. 13/631,761, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems, methods and apparatuses for implementing fast large-integer arithmetic on IA (Intel Architecture) processors.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Squaring and multiplication are the most critical widely used functions in the context of large integer arithmetic performed by processors (e.g., CPUs, processing cores, etc.). Large integer arithmetic is used in various libraries for High Performance Computing (HPC) applications such as the GNU Multiple Precision Arithmetic Library (GMP). Moreover, squaring and multiplication forms the basis of all asymmetric cryptographic algorithms, including, for example, RSA (RSA is not an acronym, but rather represents the initials of the inventors' surnames: Ron Rivest, Adi Shamir, and Leonard Adleman), Digital Signature Algorithm (DSA), Diffie-Hellman key exchange (D-H or DH), Elliptic Curve Cryptography (ECC), etc.

RSA is an algorithm for public-key cryptography that is based on the presumed difficulty of factoring large integers. A user of RSA creates and then publishes the product of two large prime numbers, along with an auxiliary value, as their public key. The prime factors must be kept secret. Anyone can use the public key to encrypt a message, but if the public key is large enough, only someone with knowledge of the prime factors can feasibly decode the message.

Large integer Multiplication and Squaring are computationally intensive problems on general-purpose processors such as IA (Intel Architecture processors) and applications such as OpenSSL (Open Source Secure Sockets Layer) and GMP often optimize for single digit performance gains.

Multiple precision arithmetic indicates that calculations are performed on numbers for which digits of precision are limited only by the available memory of the host system. This contrasts with the faster fixed-precision arithmetic which typically offers between 16 and 64 bits of precision.

Given the ubiquity of the squaring and multiplication functions by processors for the sake of security, cryptography, key exchange, RSA signature creation and verification, etc., any efficiency gains, even minor performance improvements, are highly valued to those having skill in the art and are further valued to the computing market place which benefits generally from such efficiency improvements.

The present state of the art may therefore benefit from the methods and apparatuses for implementing fast large-integer arithmetic on IA (Intel Architecture) processors as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
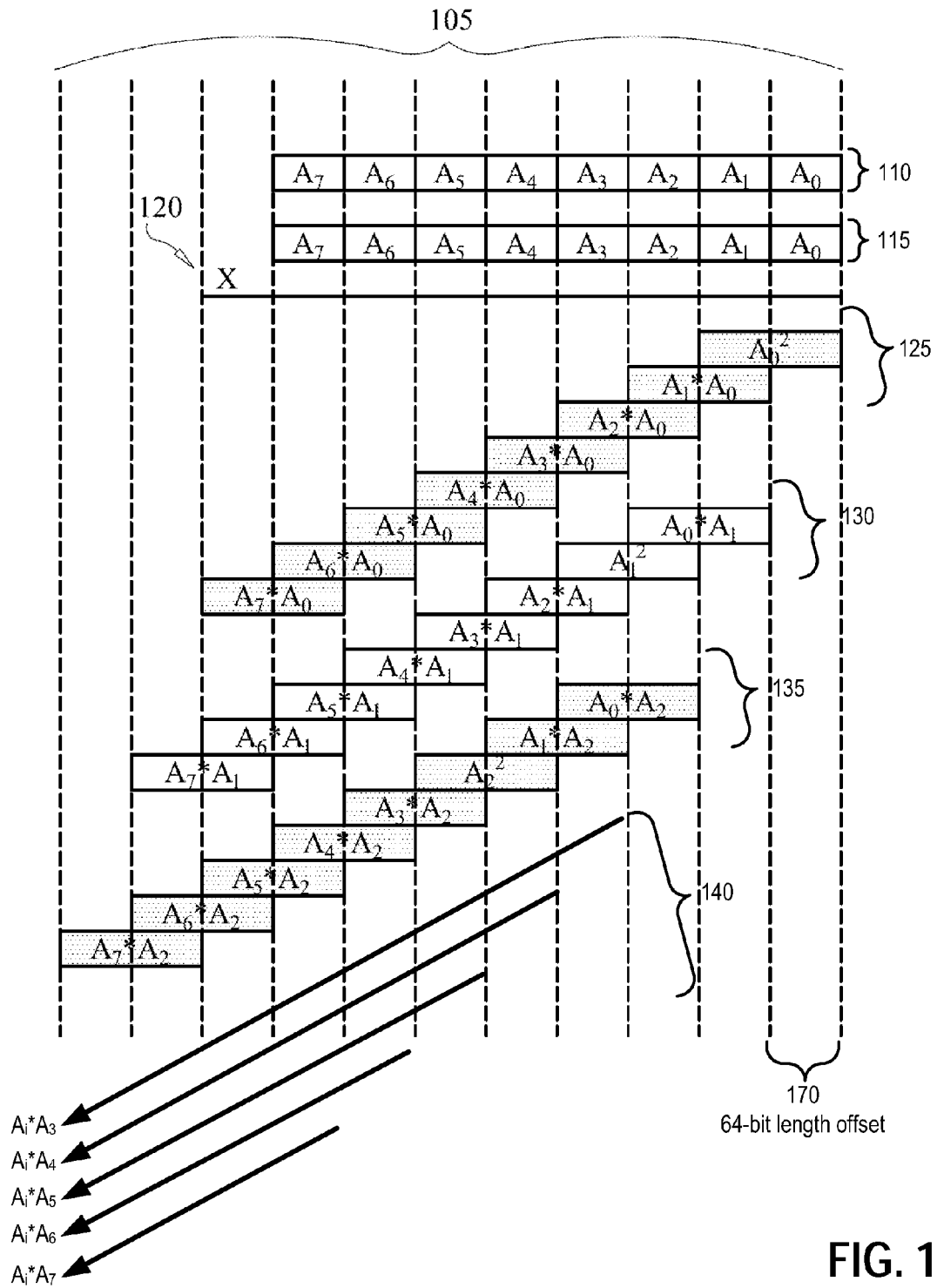
FIG. 1 illustrates an exemplary architecture in accordance with which embodiments may operate.

Described herein are systems, apparatuses, and methods for implementing fast large-integer arithmetic on IA (Intel Architecture) processors.

Squaring can be computed using multiplication routines with identical operand inputs, however, given the frequency of squaring computations, a special squaring implementation which reduces the number of base multiplications is described for utilization on such processors which yields improved performance over convectional mechanisms and improved performance over the use of standard multiplication routines.

According to the described embodiments, the improved techniques for implementing fast large-integer arithmetic on IA processors integrate with existing RSA and Multi-precision arithmetic for HPC (High Performance Computing), server refreshes, Active Server Pages (ASPs), OpenSSL implementations, and other computing utilities so as to improve the squaring functions utilized by such implementations. According to one embodiment, the techniques are optimized into x86 assembly code so as to yield better performing squaring functions using fast large-integer arithmetic on such IA possessors over, for example, processors of other architectures such as MIPS, POWER, ARM, and so forth which lack the described techniques of the x86 optimized implementation for x86 assembly code and IA type processors. The MIPS type processor architectures are a Reduced Instruction Set Computer (RISC) Instruction Set Architecture (ISA) developed by MIPS Technologies, formerly MIPS Computer Systems, Inc., in which the name itself is an acronym for "Microprocessor without Interlocked Pipeline Stages" or "M.I.P.S." The POWER processor type architecture is a Reduced Instruction Set Computer (RISC) Instruction Set Architecture (ISA) developed by IBM in which the name itself is an acronym for "Performance Optimization With Enhanced RISC" or "P.O.W.E.R." The ARM architecture describes a family of computer processors designed in accordance with a RISC CPU design developed by ARM Holdings, in which the name itself is an acronym for "Advanced RISC Machine."

Such architectures, when lacking the improved techniques for squaring and fast large-integer arithmetic as described herein will yield sub-par performance in comparison with an IA type architecture processor having the described techniques embodied therein. Conversely, such architectures, should they adopt the described methodologies, may also benefit from the performance gains described.

Other advantages and improvements over the conventionally available techniques are described in further detail below in reference to the various figures.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 105 in accordance with which embodiments may operate. In particular, a multiplication algorithm 120 is depicted in which there are identical input operands at elements 110 and 115. In particular, this is a squaring algorithm via the multiplication algorithm 120 given that each of elements 110 and 115 are the same, each including $A_0, A_1, A_2, A_3, A_4, A_5, A_6$, and $A_7$ as the respective operands.

Moreover, as depicted herein, $A_i$ is 64 bits since the core multiplier of the exemplary Central Processor Unit (CPU) CPU is a 64-bit multiplier, and thus, presented here is an example of a 512-bit squaring.

Utilizing the multiplication algorithm 120 with identical input operands 115 and 120, there are depicted three of the eight actual diagonals necessary for implementation in full detail for the sake of simplicity, specifically, diagonal 125 first, then diagonal 130, and lastly diagonal 135. The remaining five diagonals necessary for the multiplication algorithm 120 are depicted more generically at element 140, in which each of the 140 diagonals is depicted according to its remaining element by $A_i$ (e.g., $A_i*A_3$, $A_i*A_4$, $A_i*A_5$, $A_i*A_6$, and $A_i*A_7$). Thus, diagonal 125 operates for $A_i*A_0$, diagonal 130 operates for $A_i*A_1$, and diagonal 135 operates for $A_i*A_2$, and then diagonals of 140 operates for $A_i*A_3$ (first of the five diagonals of element 140), $A_i*A_4$ (second of the five diagonals of element 140), $A_i*A_5$ (third of the five diagonals of element 140), $A_i*A_6$ (fourth of the five diagonals of element 140), and $A_i*A_7$ (fifth of the five diagonals of element 140), for a total of seven diagonals to implement the multiplication algorithm 120.

Each sub-element of the respective operands 110 and 115 is a 64 bit value in a 64 bit processor, and thus, all of the elements together (e.g., $A_7$ to $A_0$) represents 512 bits of data (e.g., 64 bits multiplied by eight sub-elements of each operand is 512 bits total).

Because the operands are the same in a squaring operation, the two elements are shown as being multiplied at element 120 via the multiplication algorithm 120, in which the complete squaring operation will yield the eight diagonals described above (e.g., 125, 130, 135, and the final five diagonals grouped as 140) so as to accomplish the entire 512-bit by 512-bit multiplication.

For instance, starting with the top diagonal at element 125, $A_0$ is first multiplied by every other element, and thus, the first diagonal multiplies $A_0$ by $A_7$ (depicted as $A_7*A_0$) and the first diagonal multiplies $A_0$ by $A_6$ (depicted as $A_6*A_0$), and then $A_0$ by $A_5$, and then $A_0$ by $A_4$, and then $A_0$ by $A_3$, and then $A_0$ by $A_2$, and then $A_0$ by $A_1$, and finally $A_0$ by itself, so $A_0$ by $A_0$ (depicted as $A_0^2$), thus completing the first diagonal, in which $A_0$ has been multiplied by every other element, and by itself. Next for diagonal 130, element $A_1$ is multiplied by every other element and then by itself, and then at the third diagonal 135, $A_3$ is multiplied by every other element and then by itself, and so on for each of the remaining diagonals 140 to multiply each of the remaining $A_4$, $A_5$, $A_6$, and $A_7$, by every other element and then by its respective self.

By applying the multiplication algorithm 120 in such a way, all of the sub-elements of an operand 110 or 115 are multiplied by, for example, $A_0$ in the case of the first diagonal at element 125, and each time the multiplication algorithm 120 is performed for a given sub-element, the sub-elements all shift by 64 bits, thus resulting in the depicted diagonals 125, 130, 135, and so on for all eight sub-elements in a 64 bit processor, in which each is shifted by the depicted 64-bit length at element 170. According to one embodiment, the CPU processing core is a 64-bit processor and the 64-bit processor begins with a 64-bit offset.

Because the underlying multiplication of each appears twice, the multiplication of the sub-elements can be optimized to be processed only once for the base multiplication, and then, by adding the partial product twice to yield the same result. This optimization opportunity is true for all terms or sub-elements of the respective operands 110 and 115 $A_i*A_j$ where (i!=j), which is the largest proportion of the base products. Thus, taking all the equations for the diagonals and grouping the identical base multiplications of the same weight on the diagonals, and then by applying the optimization described above, the structure as depicted in FIG. 2 is the result.

For instance, the underlying base multiplication $A_0$ by $A_1$ appears twice. It appears in the first diagonal 125 as $A_1*A_0$ at the second to right most sub-element of diagonal 125, and then the identical underlying base multiplication $A_0$ by $A_1$ appears again as $A_0*A_1$ in the second diagonal 130 in the right most position. Because the multiplication algorithm 120 is being optimized specifically for a squaring algorithm large-integer arithmetic, elimination of one of the underlying base multiplication operations is feasible, given special handling as described below with reference to FIG. 2.

Figure 2:
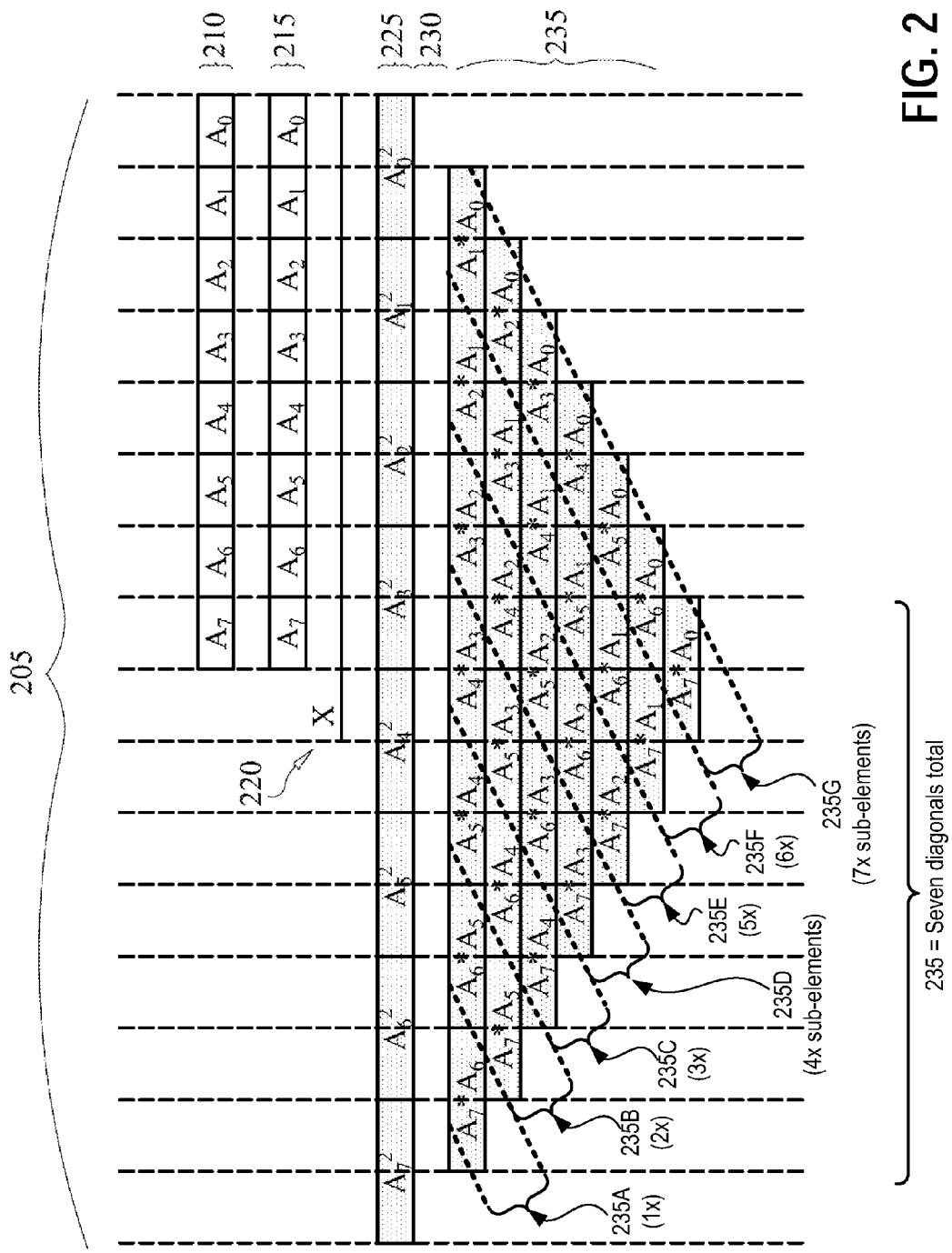
FIG. 2 illustrates another exemplary architecture in accordance with which embodiments may operate.

FIG. 2 illustrates another exemplary architecture 205 in accordance with which embodiments may operate. Here the operands from FIG. 1 are again depicted, now as operand elements 210 and 215 respectively, again representing a squaring of a 512-bit element with each of the respective sub-elements $A_0$ through $A_7$ of each being 64-bits within an exemplary 64-bit processor. Element 220 implements a squaring algorithm in which it can be seen that each of the sub-elements $A_7$ through $A_0$ are squared, represented at element 225 now as sub-elements $A_7^2$, $A_6^2$, $A_5^2$, $A_4^2$, $A_3^2$, $A_2^2$, $A_1^2$, and $A_0^2$. The block of sub-elements near the bottom at element 235 separated by the visual space 230 represent the parts or sub-elements which need to be added twice as described above.

In this structure, while the optimization has saved on the number of base multiplication operations, application of conventional large integer multiplication algorithms to the sub-element block of terms represented by element 235 results in inefficiencies due to the asymmetric diagonals. For instance, looking again to the structure of FIG. 1, every diagonal (e.g., elements 125, 130, 135, and 140) is of exactly eight sub-elements.

Conversely, the described optimization results in the structure of FIG. 2 in which the diagonals range in length from seven to one at elements 235A, 235B, 235C, 235D, 235E, 235F, and 235G. For instance, it can be seen that element 235A consists of only one sub-element (e.g., $A_7*A_6$), whereas element 235D consists of four sub-elements (e.g., $A_7*A_3$, $A_6*A_3$, $A_5*A_3$, and $A_4*A_3$), and element 235G at the longest diagonal in length consists of seven sub-elements (e.g., $A_7*A_0$, $A_6*A_0$, $A_5*A_0$, $A_4*A_0$, $A_3*A_0$, $A_2*A_0$, and $A_1*A_0$), thus resulting in a lack of symmetry which requires further optimization or re-structuring for optimal efficiency. Accordingly, further optimization is applied so as to yield symmetric diagonals in the context of squaring, while still benefiting from the above described optimization in which one of the redundant underlying base multiplication operations are eliminated and then the partial product is added twice to yield the same result.

FIG. 2 depicts two intermediate results, the first at element 235 and the second at the triangular shaped structure as the intermediate result depicted by element 235 after the visual space 230. With reference to the intermediate result at element 235 specifically, there remains seven results that need to be added in a 7×1 multiplication operation, thus going from 7, to 6, then 5, then 4, then 3, then 2, and then lastly 1. Unfortunately, at the end of every addition, a carry is required, thus resulting in inefficiency and further because shorter diagonals are more inefficient than longer diagonals due to the increased carry overhead for a given amount of work. For instance, the same carry overhead is required by sub-element 235A with just a single term as is required by sub-element 235G in which there are seven terms, also requiring a single carry overhead.

An optimization opportunity therefore exists by re-structuring or reorganizing the necessary additions into a lesser quantity of diagonals of greater lengths.

Figure 3:
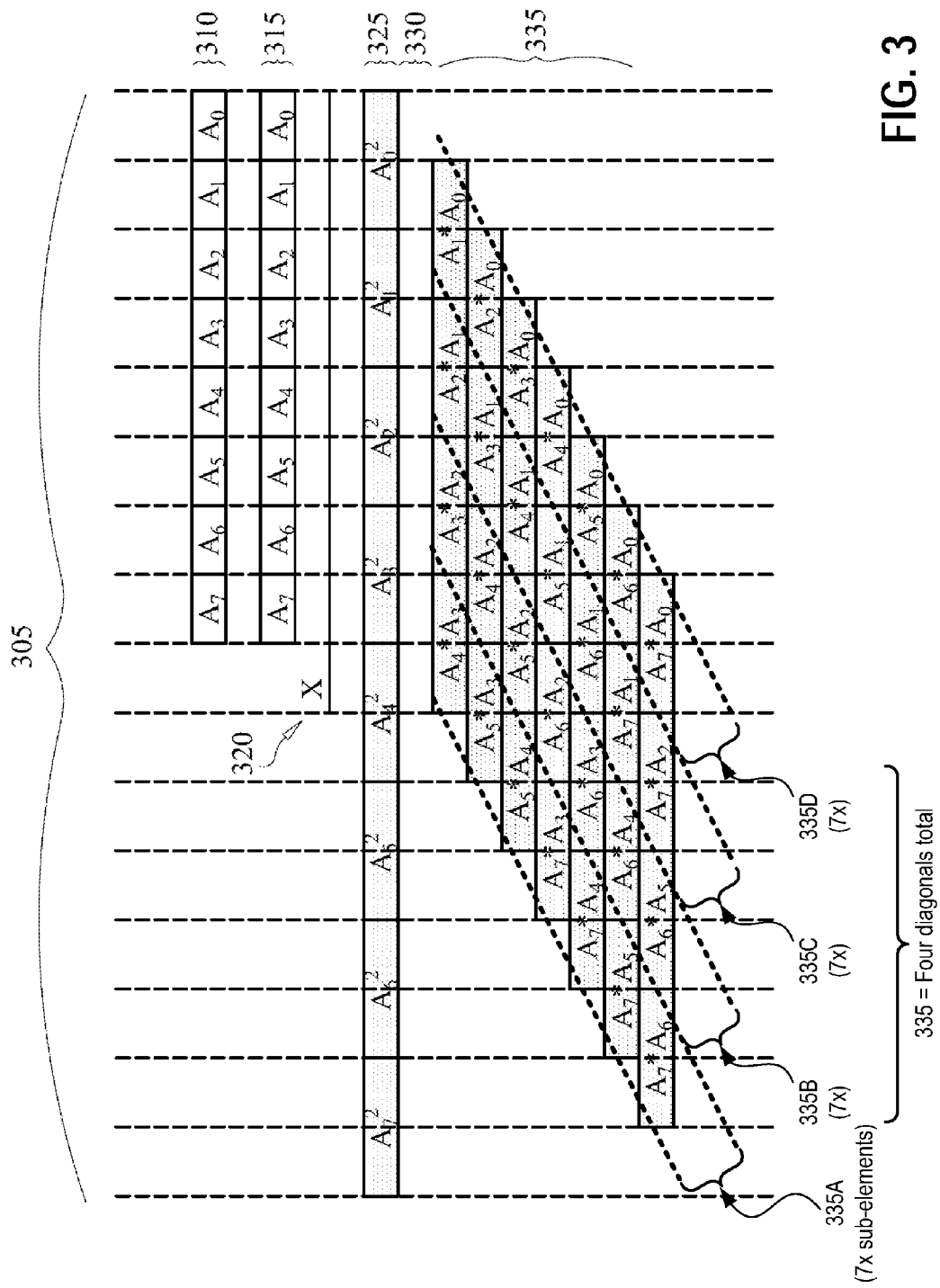
FIG. 3 illustrates another exemplary architecture in accordance with which embodiments may operate.

FIG. 3 illustrates another exemplary architecture 305 in accordance with which embodiments may operate. Here again the operands from FIGS. 1 and 2 are depicted, now as operand elements 310 and 315 respectively, again representing a squaring of a 512-bit element with each of the respective sub-elements $A_0$ through $A_7$ of each being 64-bits within an exemplary 64-bit processor. Element 320 implements a squaring algorithm in which it can be seen that each of the sub-elements $A_7$ through $A_0$ are squared, represented at element 325 now as sub-elements $A_7^2$, $A_6^2$, $A_5^2$, $A_4^2$, $A_3^2$, $A_2^2$, $A_1^2$, and $A_0^2$. The block of sub-elements near the bottom at element 335 separated by the visual space 330 represent the parts or sub-elements which need to be added twice as described above, however, in which the sub-elements are all reorganized or restructured into long 7×1 diagonals. Thus, unlike the triangular shaped intermediate result 235 of FIG. 2 having both asymmetric results and inefficient short diagonals, the restructured block of terms 335 is both symmetric insomuch as each diagonal is now a 7×1 and is further made to be more efficient by having only longer diagonals of seven terms each. In particular, it is more efficient within the IA processor to add seven or more sub-elements at a time than it is to add three or four sub-elements at a time because of the carry chain at the end of the results in which it is necessary to dump the carry somewhere, no matter the length of the diagonal or the number of sub-elements, and thus, the same overhead carry represents a performance penalty or inefficiency for shorter length diagonals with fewer sub-elements than it does for longer diagonals with a greater number of sub-elements, such as seven each as depicted by the reorganized result at element 335 of FIG. 3.

Thus, contrary to the irregular approach utilized by conventional mechanisms, the described embodiments implement the 512-bit squaring algorithm 320 in a regular way by removing the inefficiencies caused the asymmetric-size diagonals in large integer multiplications. According to one embodiment, the diagonals having the sub-elements therein required for adding are reorganized from an asymmetric structure into a symmetric structure in the context of squaring. According to one embodiment, 512-bit operands are used. According to one embodiment, the reorganizing constitutes a change in the timing and sequencing of performing additions for the depicted structure of element 335 rather than actually creating a structure of a different shape or organization.

By having symmetric diagonals for squaring as well as multiplication as depicted at element 335, the diagonals can be implemented more efficiently using HSW/BDW Instruction Set Architecture (ISA) including, for instance, mulx, adcx, and adox. The HSW/BDW acronym in HSW/BDW ISA represents Haswell/Broadwell type ISAs. The terms "adox" and "adcx" both represent eXtensions of a conventional "adc" type instruction.

The instructions to be introduced to Intel® Architecture (IA) Processors enable users to develop high-performance implementations of large integer arithmetic on such processors by programming at the assembly level. However, intrinsic definitions of mulx, adcx and adox are further to be implemented within compilers to provide an "add with carry" type instruction being implemented with intrinsics such that users to may also implement large integer arithmetic using higher level programming languages such as C/C++. The optimized code provided utilizing the described methodologies may be implemented in libraries via traditionally scalar (integer) instructions that work on the general purpose registers, including 64-bit. The mulx instruction may be implemented as an extension of the existing "mul" (e.g., multiply) instruction, with the difference being in the effect on flags (mulx dest_hi, dest_lo, src1). The mulx instruction may be implemented using an implicit src2 register, edx or rdx depending on whether the 32-bit or 64-bit version is being used, such that the operation is: dest_hi:dest_lo=src1*r/edx. The reg/mem source operand src1 is multiplied by rdx/edx, and the result is stored in the two destination registers dest_hi:dest_lo. No flags are modified, thus providing an advantage over the existing mul instruction via: (1) greater flexibility in register usage, as current mul destination registers are implicitly defined whereas with mulx, the destination registers may be distinct from the source operands, so that the source operands are not over-written, and further advantaged because (2), since no flags are modified, the mulx instructions can be mixed with add-carry instructions without corrupting the carry chain. With respect to the adcx and adox, each may be implemented as extensions of the adc instruction, designed to support two separate carry chains, defined as: adcx dest/src1, src2 adox dest/src1, src2. Both adcx and adox instructions may compute the sum of src1 and src2 plus a carry-in and generate an output sum dest and a carry-out. The difference between these two instructions is that adcx uses the Carry Flag (CF flag) for the carry in and carry out leaving the Overflow Flag (OF flag) unchanged, whereas the adox instruction uses the OF flag for the carry in and carry out leaving the CF flag unchanged.

Referring again to element 335, regrouping the bottom diagonals reveals an improved multiplication scheme due to fewer, but equal-length diagonals, for instance, in which 512-bit squaring with the bottom diagonals reordered may be realized. The four 7×1 diagonals depicted 335A, 335B, 335C, and 335D, each having the seven sub-elements therein, may be utilized efficiently to implement the squaring algorithm 320.

Reorganizing or restructuring the diagonals into symmetric and longer diagonals may be achieved in a variety of ways so as to arrive up on the depicted structure of element 335. According to one embodiment, the number of times an operand switches within a diagonal is further optimized. For instance, by optimizing the number of times an operand switches it is possible to further reduce to the total required number of load operations performed for the squaring, thus yielding further performance and efficiency gains.

For instance, as is depicted in the exemplary embodiment, at the rightmost diagonal 335D, one operand $A_0$ does not switch at all, being applied to each of $A_1$ through $A_7$. In the second to the rightmost diagonal 335C of the reorganized structure at element 335, the operand $A_1$ remains the same for the majority of the operations until the last one where it is then switched to $A_2$, but without switching $A_7$, thus again realizing an efficiency gain by eliminating load operations where feasible.

In the depicted method, every one of the diagonals 335D, 335C, and 335B, with the exception of diagonal 335A has terms where only one operand switches for the entire diagonal 335D, 335C, and 335B, thus optimizing the load operations by reducing the total number possible to performing the squaring algorithm 320, and thus realizing peak execution performance for the processor core.

Therefore, the squaring algorithm 320 can dump the carry at the beginning of the next instruction. The fewer number of diagonals 335A-D present within the reorganized structure of 335, the more efficient the squaring algorithm will operate. For example, whereas the triangular structure of element 235 at FIG. 2 has it first diagonal 235G as a 7×1, in which extra load operations are required to process the asymmetric structure 235, by reorganizing the asymmetric structure 235 into the symmetric structure of 335 by pushing the $A_7*A_2$ to the bottom such that it is reorganized at diagonal 335C of element 335 in FIG. 3, the total quantity of load operations required are reduced and the described efficiency optimizations are realized.

According to one embodiment, a CPU processing core handles the reorganization of the structure 335 of operands by placing the multiple into a register of the CPU and then calling a mulx instruction. Thus, the CPU processing core handles the structure of 335 by, for example, calling all the mulx operations with $A_5$, for example, and then when operand $A_6$ is arrived upon, the operand $A_6$ is loaded into the register, and then all the operations using operand $A_6$ are processed by the CPU processing core, and so on for each of the respective operands by processing the diagonals in the sequence shown. For the last diagonal 335 to be processed according to such an example, operand $A_3$ is as common with three occurrences as is the operand $A_7$ with three occurrences also, and thus, either may be loaded first.

The CPU processing core therefore moves the various operands up or down within the exemplary structure without changing the alignments of the products to construct the depicted diagonals 335A-D of the reorganized structure 335 at FIG. 3, so as to arrive upon the correct squaring algorithm 320 result but in a more efficient manner.

For a 512-bit by 512-bit squaring algorithm 320, the optimized and reorganized structure will always yield the four diagonals 335A-D of 7×1, and as such, the optimization opportunities are yielded through the selection of where and when to add the required sub-elements in terms of timing. Within the vertical columns between the dashed lines making up the structure 335, every single sub-element must be added to each other, and thus, in those columns, the number of elements are the same. Therefore, in accordance with one embodiment, the timing or sequence of when these elements are added together is modified resulting in the reorganizing. All of the underlying addition operations remain the same, however, what is changed is that unnecessary moves (e.g., loads and carry operations) are eliminated from the processing so as to eliminate processing overhead within the CPU processing core.

By eliminating unnecessary moves for overhead due to the carry change along with fewer number of diagonals the CPU processing core goes from having to process seven distinct diagonals at FIG. 2 for the asymmetric structure 235 to having to process only four distinct diagonals at FIG. 3 for the structure 335, and thus, overhead carry handling is also reduced. The overhead carry operation is the dumping of the carry into the final register as the result, and whatever is captured as the carry collect is then placed into the result register.

Figure 4:
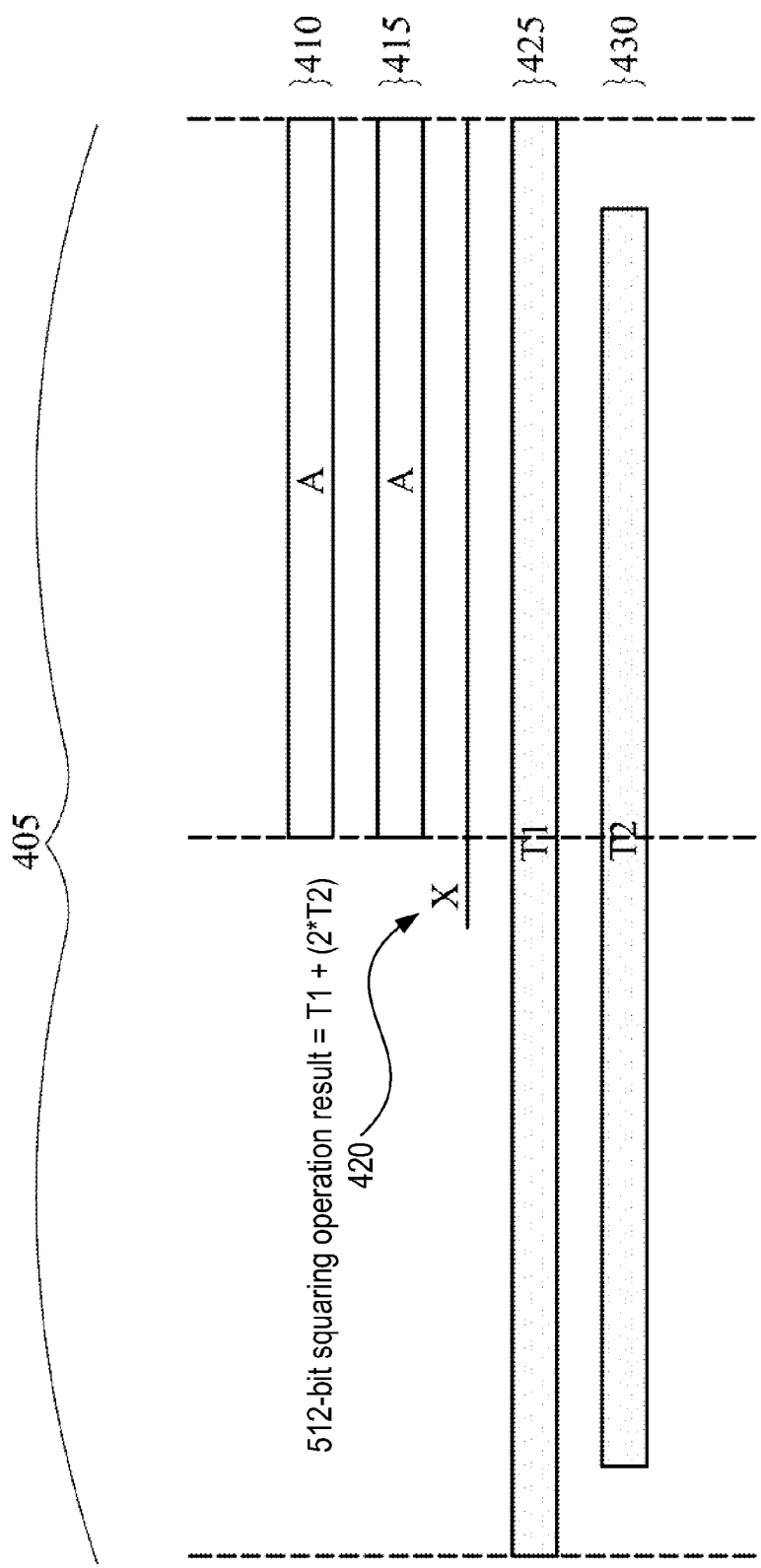
FIG. 4 illustrates another exemplary architecture in accordance with which embodiments may operate.

FIG. 4 illustrates another exemplary architecture 405 in accordance with which embodiments may operate. Here again the operands from FIGS. 1, 2, and 3 are depicted, now as operand elements 410 and 415 respectively. Element 420 implements the squaring algorithm for the previously described sub-elements $A_7$ through $A_0$, each being squared, as per the optimized reorganized structure of 335 at FIG. 3, so as to arrive upon the results depicted by FIG. 4 including T1 at element 425 and T2 at element 430.

After the core 64×64 multiplications of the exemplary 512-bit squaring operation 420, there are two intermediate results yielded, T1 at element 425 and T2 at element 430, as shown. As a final computation, it is necessary to compute T1+(2*T2). The depicted intermediate result T1 at element 425 corresponds to elements 225 and 325 of FIGS. 2 and 3 respectively, which are the squared results for each operand, that is, each operand multiplied by itself (e.g., sub-elements $A_7^2, A_6^2, A_5^2, A_4^2, A_3^2, A_2^2, A_1^2,$ and $A_0^2$) which have been depicted but not modified by the operations or optimizations discussed with regard to FIGS. 2 and 3. The depicted intermediate result T2 at element 430 corresponds to the completed additions required by the reorganized block of sub-elements 335 at FIG. 3, which as noted above, are optimized to eliminate the redundant underlying base multiplication operations, and thus, must actually be added twice to arrive upon the same result. Thus, intermediate result T1 is added to the product of two times the intermediate result T2, or [[T1+(2*T2)=result]] for the desired 512-bit squaring operation 420. Stated differently, intermediate result T1 depicts the squares of structure 325 placed next to one another and intermediate result T2 is simply the additive results of the sub-elements from structure 335 placed next to each other.

According to one embodiment, the 512-bit squaring operation [[T1+(2*T2)=result]] is implemented via the adcx and adox instructions which are capable of carrying out this final computation very efficiently. According to one embodiment, the 512-bit squaring operation [[T1+(2*T2)=result]] is implemented as [[T1+T2+T2=result]] using adcx for one addition and adox for the other, in which the technique leverages the two distinct carry chains for each of the respective adcx and adox operations, which in turn requires fewer load and store operations and thus avoids the latency of doing two single passes of using a legacy x86 adc (add-with-carry) instruction.

Figure 5:
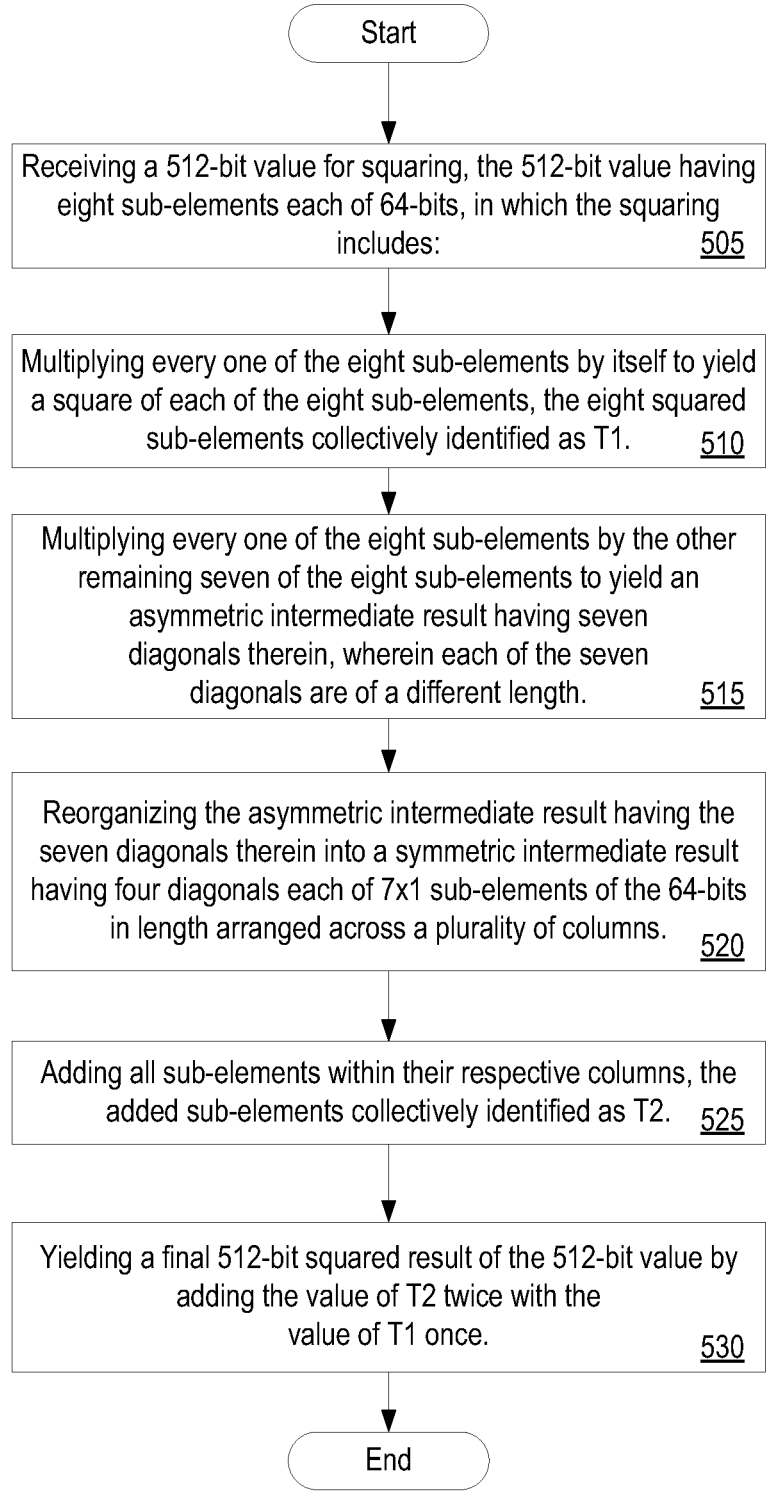
FIG. 5 is a flow diagram illustrating a method for implementing fast large-integer arithmetic on IA (Intel Architecture) processors in accordance with described embodiments.

FIG. 5 is a flow diagram illustrating a method 500 for implementing fast large-integer arithmetic on IA (Intel Architecture) processors in accordance with described embodiments. Method 500 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

At block 505, processing logic receives a 512-bit value for squaring, the 512-bit value having eight sub-elements each of 64-bits. In accordance with the described embodiments, the squaring includes the following operations.

At block 510, processing logic multiplies every one of the eight sub-elements by itself to yield a square of each of the eight sub-elements, the eight squared sub-elements collectively identified as T1.

At block 515, processing logic multiplying every one of the eight sub-elements by the other remaining seven of the eight sub-elements to yield an asymmetric intermediate result having seven diagonals therein, wherein each of the seven diagonals are of a different length.

At block 520, processing logic reorganizes the asymmetric intermediate result having the seven diagonals therein into a symmetric intermediate result having four diagonals each of 7×1 sub-elements of the 64-bits in length arranged across a plurality of columns.

At block 525, processing logic adds or sums all sub-elements within their respective columns, the added sub-elements collectively identified as T2.

At block 530, processing logic yields a final 512-bit squared result of the 512-bit value by adding the value of T2 twice with the value of T1 once.

Figure 6:
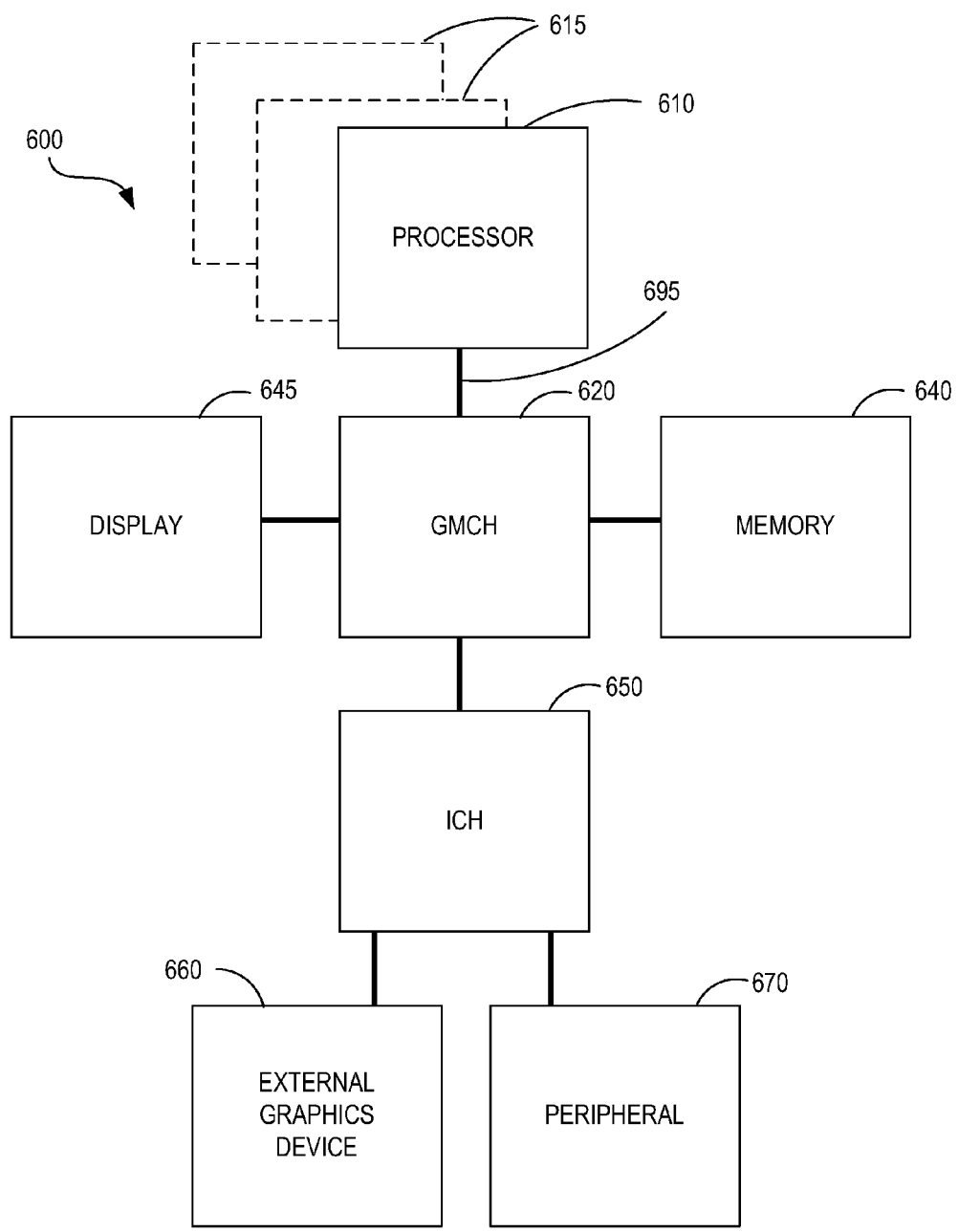
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
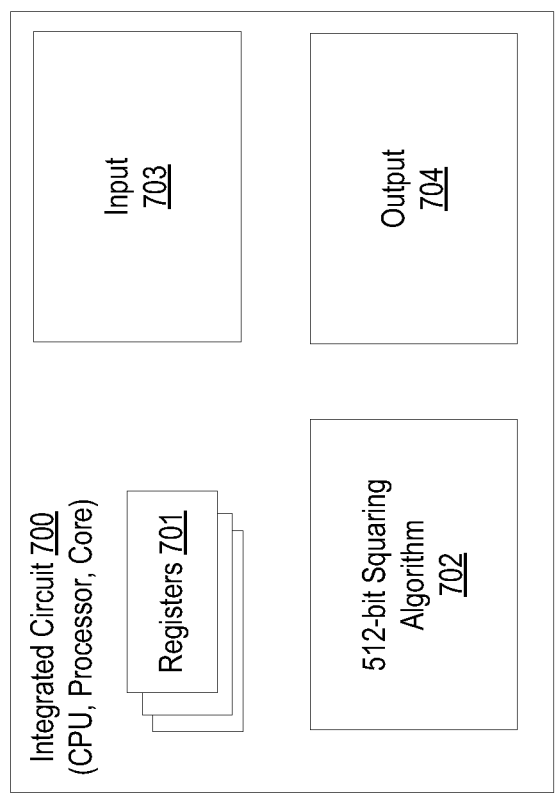
FIG. 7 is a block diagram of an integrated circuit according to one embodiment.

FIG. 7 is a block diagram of an integrated circuit 700 (e.g., a CPU, a processor, a core, etc.) according to one embodiment. In particular, there are depicted a plurality of registers 701 of the integrated circuit, an input 703, an output 704, and a 512-bit squaring algorithm 702.

In accordance with one embodiment, there is an integrated circuit 700, in which the integrated circuit includes an input 703 to receive a 512-bit value for squaring, the 512-bit value having eight sub-elements each of 64-bits, a 512-bit squaring algorithm 702 implemented as a multiply extension ("mulx") of an Instruction Set Architecture (ISA) instruction, and an output 704. According to one embodiment, the 512-bit squaring algorithm 702 is to operate by: (i) multiplying every one of the eight sub-elements by itself to yield a square of each of the eight sub-elements, the eight squared sub-elements collectively identified as T1, (ii) multiplying every one of the eight sub-elements by the other remaining seven of the eight sub-elements to yield an asymmetric intermediate result having seven diagonals therein, wherein each of the seven diagonals are of a different length, (iii) reorganizing the asymmetric intermediate result having the seven diagonals therein into a symmetric intermediate result having four diagonals each of 7×1 sub-elements of the 64-bits in length arranged across a plurality of columns, (iv) adding all sub-elements within their respective columns, the added sub-elements collectively identified as T2, and (v) yielding a final 512-bit squared result of the 512-bit value by adding the value of T2 twice with the value of T1 once. According to such an embodiment, the output 704 is to further egress the final 512-bit squared result of the 512-bit value.

According to one embodiment, the integrated circuit 700 includes a plurality of registers 701 and the integrated circuit 700 loads and switches operands for the 512-bit squaring algorithm 702 by retrieving operands from and storing operands to the plurality of registers.

Figure 8A:
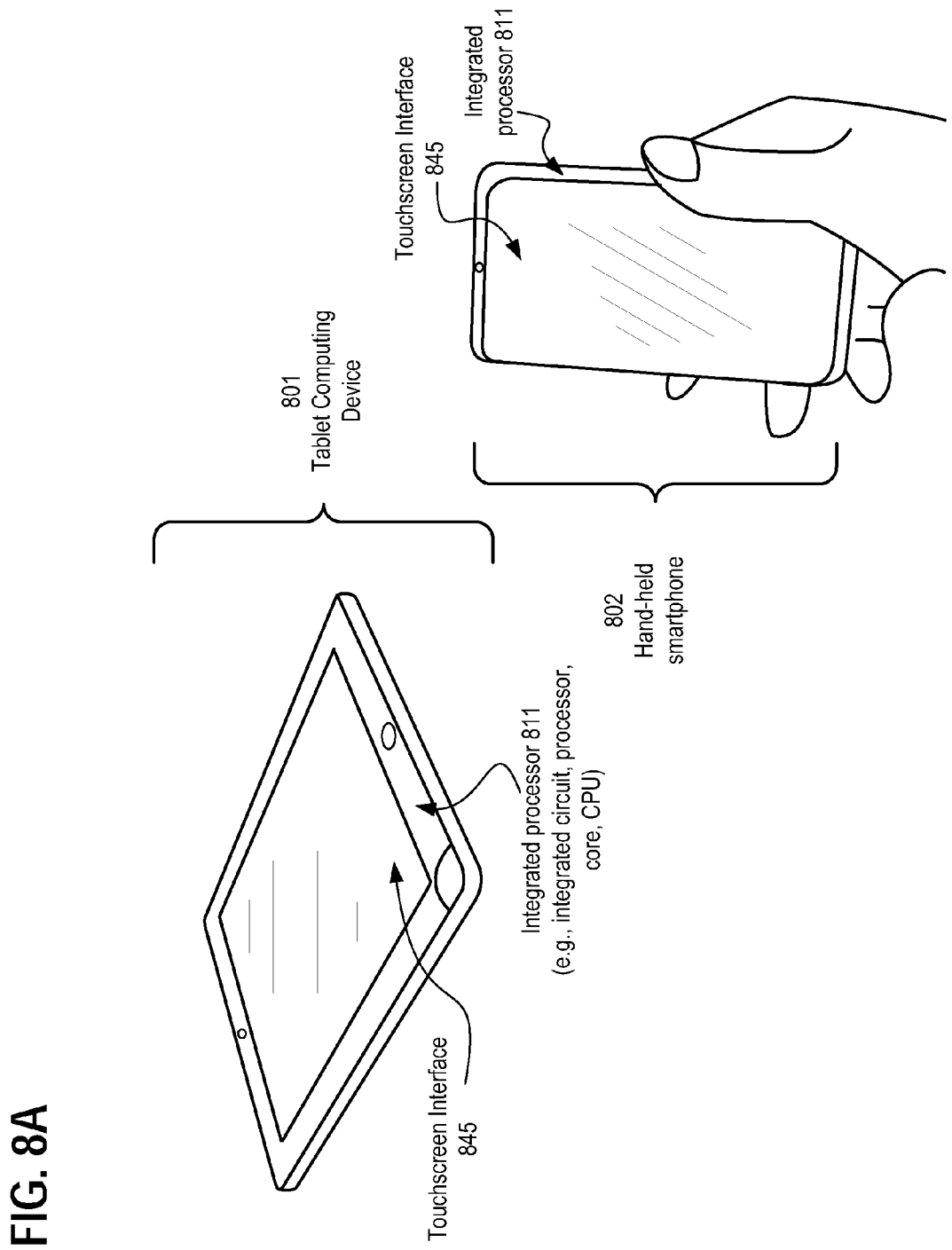
FIG. 8A depicts a tablet computing device and a hand-held smartphone each having a circuitry, components, and functionality integrated therein as described in accordance with the embodiments.

FIG. 8A depicts a tablet computing device 801 and a hand-held smartphone 802 each having a circuitry, components, and functionality integrated therein as described in accordance with the embodiments, such as a security module for a receiving computing device embodied within the tablet computing device 801 and a hand-held smartphone 802 for implementing fast large-integer arithmetic on IA (Intel Architecture) processors. As depicted, each of the tablet computing device 801 and the hand-held smartphone 802 include a touchscreen interface 845 and an integrated processor 811 in accordance with disclosed embodiments.

For example, in one embodiment, a client device, such as the exemplary computing platform depicted at element 101 of FIG. 1, may be embodied by a tablet computing device 801 or a hand-held smartphone 802, in which a display unit of the apparatus includes the touchscreen interface 845 for the tablet or smartphone and further in which memory and an integrated circuit operating as an integrated processor 811 are incorporated into the tablet or smartphone. In such an embodiment, the integrated processor 811 includes functionality to implement fast large-integer arithmetic on IA (Intel Architecture) processors according to the techniques described above.

Figure 8B:
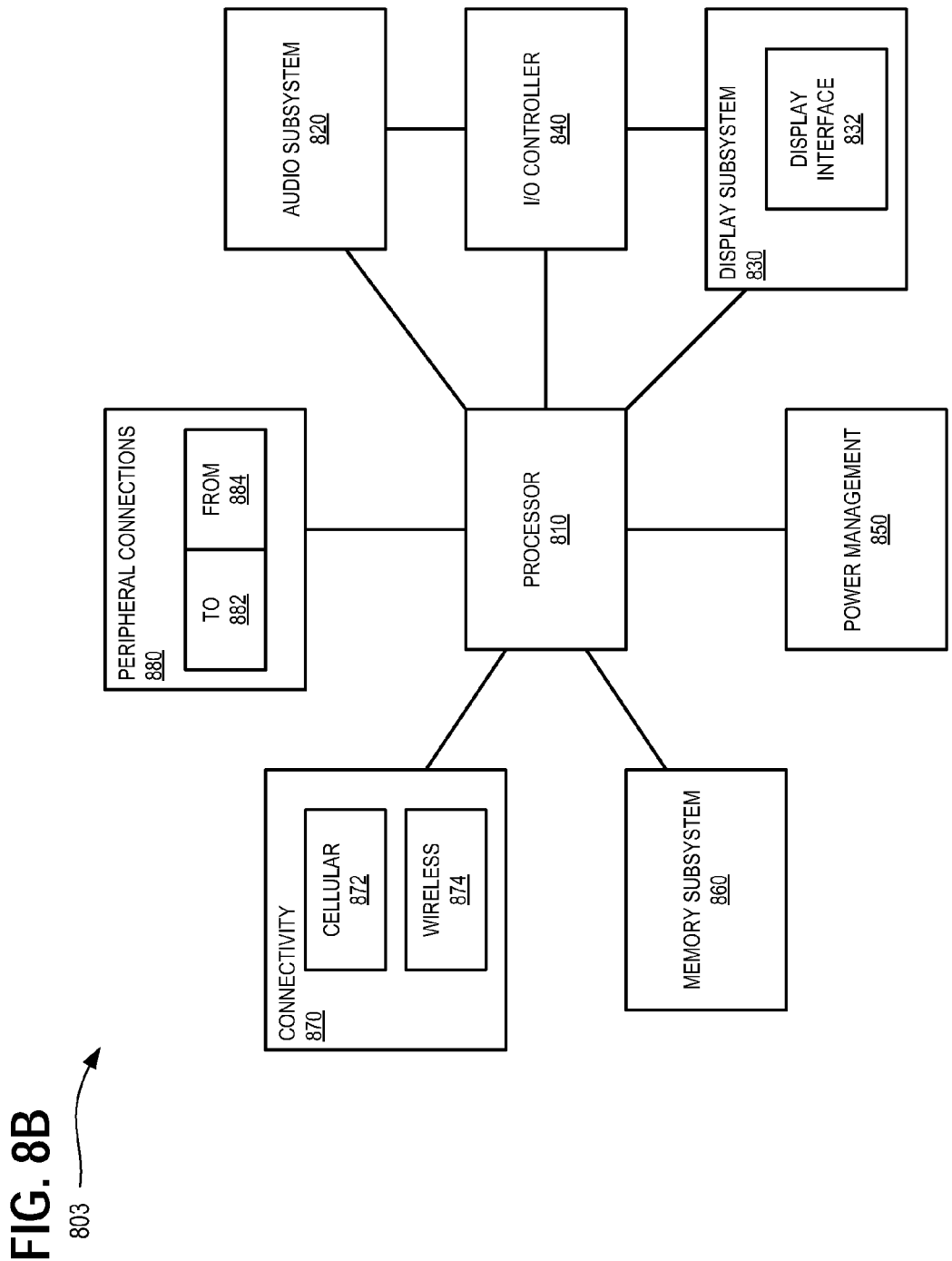
FIG. 8B is a block diagram of an embodiment of tablet computing device, a smart phone, or other mobile device in which touchscreen interface connectors are used.

FIG. 8B is a block diagram 803 of an embodiment of a tablet computing device, a smart phone, or other mobile device in which touchscreen interface connectors are used. Processor 810 performs the primary processing operations. Audio subsystem 820 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 810.

Display subsystem 830 represents hardware (e.g., display devices) and software (e.g., drivers) components that provide a visual and/or tactile display for a user to interact with the tablet computing device or smart phone. Display subsystem 830 includes display interface 832, which includes the particular screen or hardware device used to provide a display to a user. In one embodiment, display subsystem 830 includes a touchscreen device that provides both output and input to a user.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to the tablet computing device or smart phone through which a user might interact. In one embodiment, I/O controller 840 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 850 that manages battery power usage, charging of the battery, and features related to power saving operation. Memory subsystem 860 includes memory devices for storing information in the tablet computing device or smart phone. Connectivity 870 includes hardware devices (e.g., wireless and/or wired connectors and communication hardware) and software components (e.g., drivers, protocol stacks) to the tablet computing device or smart phone to communicate with external devices. Cellular connectivity 872 may include, for example, wireless carriers such as GSM (global system for mobile communications), CDMA (code division multiple access), TDM (time division multiplexing), or other cellular service standards). Wireless connectivity 874 may include, for example, activity that is not cellular, such as personal area networks (e.g., Bluetooth), local area networks (e.g., WiFi), and/or wide area networks (e.g., WiMax), or other wireless communication.

Peripheral connections 880 include hardware interfaces and connectors, as well as software components (e.g., drivers, protocol stacks) to make peripheral connections as a peripheral device ("to" 882) to other computing devices, as well as have peripheral devices ("from" 884) connected to the tablet computing device or smart phone, including, for example, a "docking" connector to connect with other computing devices. Peripheral connections 880 include common or standards-based connectors, such as a Universal Serial Bus (USB) connector, DisplayPort including MiniDisplayPort (MDP), High Definition Multimedia Interface (HDMI), Firewire, etc.

Figure 9:
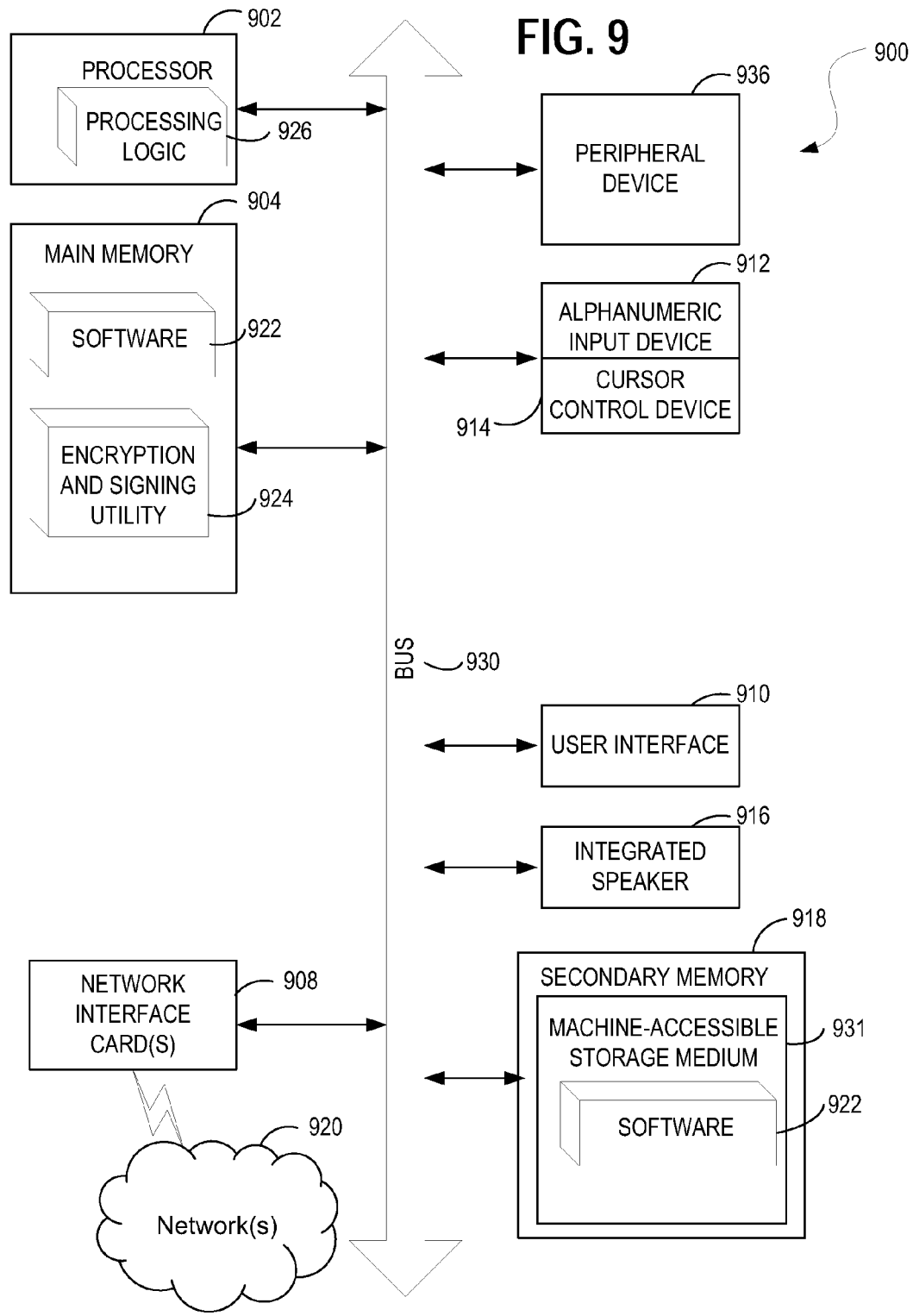
FIG. 9 illustrates a diagrammatic representation of a machine in the exemplary form of a computer system, in accordance with one embodiment.

FIG. 9 illustrates a diagrammatic representation of a machine 900 in the exemplary form of a computer system, in accordance with one embodiment, within which a set of instructions, for causing the machine 900 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 918 (e.g., a persistent storage device including hard disk drives and persistent data base implementations), which communicate with each other via a bus 930. Main memory 904 includes information and instructions and software program components necessary for performing and executing the functions with respect to the various embodiments of the systems, methods, and entities as described herein including functionality to implement fast large-integer arithmetic on IA (Intel Architecture) processors according to the techniques described above. The encryption and signing utility 924 may be stored within main memory 904 and operate in conjunction with the 512-bit squaring algorithm implemented by an integrated circuit or carried as processing logic 926 of such a processor 902 or integrated circuit, for instance, to support RSA and other encryption and digital signature functionality required by the machine 500. Main memory 904 and its sub-elements (e.g. 922 and 924) are operable in conjunction with processing logic 926 and/or software 922, firmware, and processor 902 to perform the methodologies discussed herein.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and functionality which is discussed herein.

The computer system 900 may further include one or more network interface cards 908 to communicatively interface the computer system 900 with one or more networks 920, such as the Internet or a publicly accessible network. The computer system 900 also may include a user interface 910 (such as a video display unit, a liquid crystal display (LCD), or a cathode ray tube (CRT)), an alphanumeric input device 912 (e.g., a keyboard), a cursor control device 914 (e.g., a mouse), and a signal generation device 916 (e.g., an integrated speaker). The computer system 900 may further include peripheral device 936 (e.g., wireless or wired communication devices, memory devices, storage devices, audio processing devices, video processing devices, etc.).

The secondary memory 918 may include a non-transitory machine-readable storage medium (or more specifically a non-transitory machine-accessible storage medium) 931 on which is stored one or more sets of instructions (e.g., software 922) embodying any one or more of the methodologies or functions described herein. Software 922 may also reside, or alternatively reside within main memory 904, and may further reside completely or at least partially within the processor 902 during execution thereof by the computer system 900, the main memory 904 and the processor 902 also constituting machine-readable storage media. The software 922 may further be transmitted or received over a network 920 via the network interface card 908.

In accordance with the preceding disclosure, the following exemplary embodiments are presented as follows:

According to a first embodiment there is method in an integrated circuit, such as a processor, CPU, processing core, etc. According to such an embodiment, the method includes operations for receiving a 512-bit value for squaring, the 512-bit value having eight sub-elements each of 64-bits; performing a 512-bit squaring algorithm by: (i) multiplying every one of the eight sub-elements by itself to yield a square of each of the eight sub-elements, the eight squared sub-elements collectively identified as T1, (ii) multiplying every one of the eight sub-elements by the other remaining seven of the eight sub-elements to yield an asymmetric intermediate result having seven diagonals therein, wherein each of the seven diagonals are of a different length, (iii) reorganizing the asymmetric intermediate result having the seven diagonals therein into a symmetric intermediate result having four diagonals each of 7×1 sub-elements of the 64-bits in length arranged across a plurality of columns, (iv) adding all sub-elements within their respective columns, the added sub-elements collectively identified as T2, and (v) yielding a final 512-bit squared result of the 512-bit value by adding the value of T2 twice with the value of T1 once.

According to another embodiment of the method, reorganizing the asymmetric intermediate result having the seven diagonals therein into a symmetric intermediate result having four diagonals each of 7×1 sub-elements of the 64-bits in length arranged across a plurality of columns, includes: changing the sequence and timing of (iv) adding all sub-elements within their respective columns.

According to another embodiment of the method, the asymmetric intermediate result having the seven diagonals therein, each of a different length, requires seven overhead carries within a non-optimized 512-bit squaring algorithm; and in which the symmetric intermediate result having the four diagonals each of 7×1 sub-elements of the 64-bits in length arranged across a plurality of columns, requires four overhead carries within an optimized 512-bit squaring algorithm.

According to another embodiment of the method, the (iv) adding all sub-elements within their respective columns, includes: adding a first of the four diagonals each of 7×1 sub-elements of the 64-bits in length in which one operand is loaded once and does not switch; adding a second and a third of the four diagonals each of 7×1 sub-elements of the 64-bits in length in which only one operand is switched after an initial load; and adding a fourth of the four diagonals each of 7×1 sub-elements of the 64-bits in length in which a plurality of operand switches occur after an initial load.

According to another embodiment of the method, the integrated circuit includes a plurality of registers, and in which loading and switching the operands includes retrieving operands from and storing operands to the plurality of registers.

According to another embodiment of the method, a first quantity of operand switches necessary for (iv) adding all sub-elements within their respective columns within an optimized 512-bit squaring algorithm is fewer than a second quantity of operand switches necessary for adding all sub-elements within columns of a non-optimized 512-bit squaring algorithm.

According to another embodiment of the method, the asymmetric intermediate result having the seven diagonals therein forms an asymmetric triangular shaped structure in which each of the seven diagonals are of a different length.

According to another embodiment of the method, multiplying every one of the eight sub-elements by the other remaining seven of the eight sub-elements to yield an asymmetric intermediate result having seven diagonals therein, includes: each of the seven diagonals offset by 64-bits such that a first of the seven diagonals is a 7×1 diagonal in length, then a second is a 6×1 diagonal in length, then a third is a 5×1 diagonal in length, then a fourth is a 4×1 diagonal in length, then a fifth is a 3×1 diagonal in length, then a sixth is a 2×1 diagonal in length, and then a seventh is a 1×1 diagonal in length.

According to another embodiment of the method, the (v) yielding a final 512-bit squared result of the 512-bit value by adding the value of T2 twice with the value of T1 once, includes performing a computation according to one of: computing T1+(2*T2); or computing T1+T2+T2.

According to another embodiment of the method, the (v) yielding a final 512-bit squared result of the 512-bit value by adding the value of T2 twice with the value of T1 once, includes: computing T1+T2+T2 using an adcx operation for a first of the two additions and an adox operation for a second of the two additions.

According to another embodiment of the method, which using the adcx operation for the first of the two additions and the adox operation for the second of the two additions includes: using two distinct carry chains for each of the respective adcx and adox operations, in which fewer load and store operations are required in comparison with using a single carry chain, and further in which latency is reduced over performing the computation using two single passes using a legacy x86 add-with-carry (adc) instruction.

According to another embodiment of the method, the integrated circuit includes an Intel Architecture type Central Processing Core (CPU).

According to another embodiment of the method, the integrated circuit includes a 64-bit processor core.

According to another embodiment of the method, the integrated circuit is embodied within one of a tablet computing device or a smartphone.

According to a particular embodiment, there are one or more non-transitory computer readable storage media having instructions stored thereon that, when executed by an integrated circuit, the instructions cause the integrated circuit to perform operations including: receiving a 512-bit value for squaring, the 512-bit value having eight sub-elements each of 64-bits; performing a 512-bit squaring algorithm by: (i) multiplying every one of the eight sub-elements by itself to yield a square of each of the eight sub-elements, the eight squared sub-elements collectively identified as T1, (ii) multiplying every one of the eight sub-elements by the other remaining seven of the eight sub-elements to yield an asymmetric intermediate result having seven diagonals therein, wherein each of the seven diagonals are of a different length, (iii) reorganizing the asymmetric intermediate result having the seven diagonals therein into a symmetric intermediate result having four diagonals each of 7×1 sub-elements of the 64-bits in length arranged across a plurality of columns, (iv) adding all sub-elements within their respective columns, the added sub-elements collectively identified as T2, and (v) yielding a final 512-bit squared result of the 512-bit value by adding the value of T2 twice with the value of T1 once.

According to another embodiment of the one or more non-transitory computer readable storage media, reorganizing the asymmetric intermediate result having the seven diagonals therein into a symmetric intermediate result having four diagonals each of 7×1 sub-elements of the 64-bits in length arranged across a plurality of columns, includes: changing the sequence and timing of (iv) adding all sub-elements within their respective columns.

According to another embodiment of the one or more non-transitory computer readable storage media, the asymmetric intermediate result having the seven diagonals therein, each of a different length, requires seven overhead carries within a non-optimized 512-bit squaring algorithm; and in which the symmetric intermediate result having the four diagonals each of 7×1 sub-elements of the 64-bits in length arranged across a plurality of columns, requires four overhead carries within an optimized 512-bit squaring algorithm.

According to another embodiment of the one or more non-transitory computer readable storage media, the (iv) adding all sub-elements within their respective columns, includes: adding a first of the four diagonals each of 7×1 sub-elements of the 64-bits in length in which one operand is loaded once and does not switch; adding a second and a third of the four diagonals each of 7×1 sub-elements of the 64-bits in length in which only one operand is switched after an initial load; and adding a fourth of the four diagonals each of 7×1 sub-elements of the 64-bits in length in which a plurality of operand switches occur after an initial load.

According to another embodiment of the one or more non-transitory computer readable storage media, multiplying every one of the eight sub-elements by the other remaining seven of the eight sub-elements to yield an asymmetric intermediate result having seven diagonals therein, includes: each of the seven diagonals offset by 64-bits such that a first of the seven diagonals is a 7×1 diagonal in length, then a second is a 6×1 diagonal in length, then a third is a 5×1 diagonal in length, then a fourth is a 4×1 diagonal in length, then a fifth is a 3×1 diagonal in length, then a sixth is a 2×1 diagonal in length, and then a seventh is a 1×1 diagonal in length.

According to another exemplary embodiment, there is an integrated circuit. According to such an embodiment, the integrated circuit includes an input to receive a 512-bit value for squaring, the 512-bit value having eight sub-elements each of 64-bits; and a 512-bit squaring algorithm implemented as a multiply extension ("mulx") of an Instruction Set Architecture (ISA) instruction, in which the 512-bit squaring algorithm to operate by: (i) multiplying every one of the eight sub-elements by itself to yield a square of each of the eight sub-elements, the eight squared sub-elements collectively identified as T1, (ii) multiplying every one of the eight sub-elements by the other remaining seven of the eight sub-elements to yield an asymmetric intermediate result having seven diagonals therein, wherein each of the seven diagonals are of a different length, (iii) reorganizing the asymmetric intermediate result having the seven diagonals therein into a symmetric intermediate result having four diagonals each of 7×1 sub-elements of the 64-bits in length arranged across a plurality of columns, (iv) adding all sub-elements within their respective columns, the added sub-elements collectively identified as T2, and (v) yielding a final 512-bit squared result of the 512-bit value by adding the value of T2 twice with the value of T1 once; and an output to egress the final 512-bit squared result of the 512-bit value.

According to another embodiment, the integrated circuit is embodied within one of a tablet computing device or smartphone; and in which the tablet computing device or smartphone further includes a touch screen interface.

According to another embodiment, the integrated circuit is an Intel Architecture type Central Processing Core (CPU).

According to another embodiment, the integrated circuit is a 64-bit processor core.

According to another embodiment of the integrated circuit, the asymmetric intermediate result having the seven diagonals therein, each of a different length, requires seven overhead carries within a non-optimized 512-bit squaring algorithm; and in which the symmetric intermediate result having the four diagonals each of 7×1 sub-elements of the 64-bits in length arranged across a plurality of columns, requires four overhead carries within an optimized 512-bit squaring algorithm.

According to another embodiment of the integrated circuit, the (iv) adding all sub-elements within their respective columns, includes: adding a first of the four diagonals each of 7×1 sub-elements of the 64-bits in length in which one operand is loaded once and does not switch; adding a second and a third of the four diagonals each of 7×1 sub-elements of the 64-bits in length in which only one operand is switched after an initial load; and adding a fourth of the four diagonals each of 7×1 sub-elements of the 64-bits in length in which a plurality of operand switches occur after an initial load.

According to another embodiment of the integrated circuit, multiplying every one of the eight sub-elements by the other remaining seven of the eight sub-elements to yield an intermediate result having seven diagonals therein, includes: each of the seven diagonals offset by 64-bits such that a first of the seven diagonals is a 7×1 diagonal in length, then a second is a 6×1 diagonal in length, then a third is a 5×1 diagonal in length, then a fourth is a 4×1 diagonal in length, then a fifth is a 3×1 diagonal in length, then a sixth is a 2×1 diagonal in length, and then a seventh is a 1×1 diagonal in length.

According to yet another embodiment, there is a system. According to such an embodiment, the system includes: a system bus; a touch screen interface coupled with the system bus; a memory coupled with the system bus; a processor coupled with the system bus; and a 512-bit squaring algorithm to operate in conjunction with the memory and the processor by: (i) receiving a 512-bit value for squaring, the 512-bit value having eight sub-elements each of 64-bits; and (ii) multiplying every one of the eight sub-elements by itself to yield a square of each of the eight sub-elements, the eight squared sub-elements collectively identified as T1, (iii) multiplying every one of the eight sub-elements by the other remaining seven of the eight sub-elements to yield an asymmetric intermediate result having seven diagonals therein, wherein each of the seven diagonals are of a different length, (iv) reorganizing the asymmetric intermediate result having the seven diagonals therein into a symmetric intermediate result having four diagonals each of 7×1 sub-elements of the 64-bits in length arranged across a plurality of columns, (v) adding all sub-elements within their respective columns, the added sub-elements collectively identified as T2, and (vi) yielding a final 512-bit squared result of the 512-bit value by adding the value of T2 twice with the value of T1 once.

According to another embodiment, the system having therein the system bus, the memory, the processor, and the 512-bit squaring algorithm, is embodied within one of a tablet computing device or smartphone.

According to another embodiment of the system, the integrated circuit of the system is a 64-bit Intel Architecture type Central Processing Core (CPU).

According to another embodiment of the system, the asymmetric intermediate result having the seven diagonals therein, each of a different length, requires seven overhead carries within a non-optimized 512-bit squaring algorithm; and in which the symmetric intermediate result having the four diagonals each of 7×1 sub-elements of the 64-bits in length arranged across a plurality of columns, requires four overhead carries within an optimized 512-bit squaring algorithm.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in an integrated circuit, the integrated circuit having a plurality of registers for storing operands, the method comprising:
   receiving a 512-bit value for squaring, the 512-bit value having eight sub-elements each of 64-bits;
   performing a 512-bit squaring algorithm by:
   (i) multiplying every one of the eight sub-elements by itself to yield a square of each of the eight sub-elements, the eight squared sub-elements collectively identified as T1,
   (ii) multiplying every one of the eight sub-elements by the other remaining seven of the eight sub-elements to yield an asymmetric intermediate result having seven diagonals therein, wherein each of the seven diagonals are of a different length,
   (iii) reorganizing the asymmetric intermediate result having the seven diagonals therein into a symmetric intermediate result having four diagonals each of 7×1 sub-elements of the 64-bits in length arranged across a plurality of columns, wherein fewer load and store operations from the plurality of registers are required after the reorganizing;
   (iv) for each of the plurality of columns, adding all sub-elements within the respective one of the plurality of columns, the added sub-elements collectively identified as T2, and
   (v) yielding a final 512-bit squared result of the 512-bit value by adding the value of T2 twice with the value of T1 once; and wherein the (iv) adding all sub-elements within their respective columns, further includes: (a) adding a first of the four diagonals each of 7×1 sub-elements of the 64-bits in length in which one operand is loaded once and does not switch, (b) adding a second and a third of the four diagonals each of 7×1 sub-elements of the 64-bits in length in which only one operand is switched after an initial load, and (c) adding a fourth of the four diagonals each of 7×1 sub-elements of the 64-bits in length in which a plurality of operand switches occur after an initial load.

2. The method of claim 1, wherein the (iii) reorganizing constitutes a change in the timing and sequencing of performing additions for the 7×1 sub-elements of the 64-bits in length arranged across a plurality of columns without creating a structure of a different shape or organization through a change in timing of performing additions or a change in sequencing of performing additions, or both.

3. The method of claim 1:
wherein the asymmetric intermediate result having the seven diagonals therein, each of a different length, requires seven overhead carries within a non-optimized 512-bit squaring algorithm; and
wherein the symmetric intermediate result having the four diagonals each of 7×1 sub-elements of the 64-bits in length arranged across a plurality of columns, requires four overhead carries within an optimized 512-bit squaring algorithm.

4. The method of claim 1, wherein the asymmetric intermediate result having the seven diagonals therein comprises an asymmetric triangular shaped structure in which each of the seven diagonals are of a different length.

5. The method of claim 1, wherein multiplying every one of the eight sub-elements by the other remaining seven of the eight sub-elements to yield an asymmetric intermediate result having seven diagonals therein, comprises:
each of the seven diagonals offset by 64-bits such that a first of the seven diagonals is a 7×1 diagonal in length, then a second is a 6×1 diagonal in length, then a third is a 5×1 diagonal in length, then a fourth is a 4×1 diagonal in length, then a fifth is a 3×1 diagonal in length, then a sixth is a 2×1 diagonal in length, and then a seventh is a 1×1 diagonal in length.

6. The method of claim 1, wherein (v) yielding a final 512-bit squared result of the 512-bit value by adding the value of T2 twice with the value of T1 once, comprises performing a computation according to one of:
computing T1+(2*T2); or
computing T1+T2+T2.

7. The method of claim 1, wherein (v) yielding a final 512-bit squared result of the 512-bit value by adding the value of T2 twice with the value of T1 once, comprises:
computing T1+T2+T2 using an adcx operation for a first of the two additions and an adox operation for a second of the two additions;
wherein the adcx operation constitutes an add with carry operation having an extension utilizing a Carry Flag (CF flag); and
wherein the adox operation constitutes an add with carry operation having an extension utilizing an Overflow Flag (OF flag).

8. The method of claim 7, wherein using the adcx operation for the first of the two additions and the adox operation for the second of the two additions comprises:
using two distinct carry chains for each of the respective adcx and adox operations resulting in the fewer load and store operations being required in comparison with using a single carry chain, and further wherein latency is reduced over performing the computation using two single passes using a legacy x86 add-with-carry (adc) instruction.

9. The method of claim 1, wherein the integrated circuit comprises an Intel Architecture type Central Processing Unit (CPU) or alternatively wherein the integrated circuit comprises a 64-bit processor core.

10. The method of claim 1, wherein the integrated circuit is embodied within one of a tablet computing device or a smartphone.

11. The method of claim 1, wherein the (v) yielding a final 512-bit squared result of the 512-bit value by adding the value of T2 twice with the value of T1 once comprises yielding the final 512-bit squared result further by using two distinct carry chains for adding the value of T2 twice and the value of T1 once, wherein fewer load and store operations are required in comparison with using a single carry chain.

12. A method in an integrated circuit, the method comprising:
receiving a 512-bit value for squaring, the 512-bit value having eight sub-elements each of 64-bits;
performing a 512-bit squaring algorithm by:
(i) multiplying every one of the eight sub-elements by itself to yield a square of each of the eight sub-elements, the eight squared sub-elements collectively identified as T1,
(ii) multiplying every one of the eight sub-elements by the other remaining seven of the eight sub-elements to yield an asymmetric intermediate result having seven diagonals therein, wherein each of the seven diagonals are of a different length,
(iii) reorganizing the asymmetric intermediate result having the seven diagonals therein into a symmetric intermediate result having four diagonals each of 7×1 sub-elements of the 64-bits in length arranged across a plurality of columns,
(iv) adding all sub-elements within their respective columns, the added sub-elements collectively identified as T2, wherein the adding all sub-elements within their respective columns, comprises: (a) adding a first of the four diagonals each of 7×1 sub-elements of the 64-bits in length in which one operand is loaded once and does not switch; (b) adding a second and a third of the four diagonals each of 7×1 sub-elements of the 64-bits in length in which only one operand is switched after an initial load, and (c) adding a fourth of the four diagonals each of 7×1 sub-elements of the 64-bits in length in which a plurality of operand switches occur after an initial load; and
(v) yielding a final 512-bit squared result of the 512-bit value by adding the value of T2 twice with the value of T1 once.

13. The method of claim 12, wherein the integrated circuit operates such that loading and switching the operands comprises retrieving operands from and storing operands to the plurality of registers.

14. The method of claim 12, wherein the integrated circuit comprises an Intel Architecture type Central Processing Unit (CPU) or alternatively wherein the integrated circuit comprises a 64-bit processor core.

15. One or more non-transitory computer readable storage media having instructions stored thereon that, when executed by an integrated circuit having a plurality of registers for storing operands, the instructions cause the integrated circuit to perform operations including:

receiving a 512-bit value for squaring, the 512-bit value having eight sub-elements each of 64-bits;
performing a 512-bit squaring algorithm by:
(i) multiplying every one of the eight sub-elements by itself to yield a square of each of the eight sub-elements, the eight squared sub-elements collectively identified as T1,
(ii) multiplying every one of the eight sub-elements by the other remaining seven of the eight sub-elements to yield an asymmetric intermediate result having seven diagonals therein, wherein each of the seven diagonals are of a different length,
(iii) reorganizing the asymmetric intermediate result having the seven diagonals therein into a symmetric intermediate result having four diagonals each of 7×1 sub-elements of the 64-bits in length arranged across a plurality of columns, wherein fewer load and store operations from the plurality of registers are required after the reorganizing;
(iv) for each of the plurality of columns, adding all sub-elements within the respective one of the plurality of columns, the added sub-elements collectively identified as T2, and
(v) yielding a final 512-bit squared result of the 512-bit value by adding the value of T2 twice with the value of T1 once; and
wherein the (iv) adding all sub-elements within their respective columns, further includes: (a) adding a first of the four diagonals each of 7×1 sub-elements of the 64-bits in length in which one operand is loaded once and does not switch, (b) adding a second and a third of the four diagonals each of 7×1 sub-elements of the 64-bits in length in which only one operand is switched after an initial load, and (c) adding a fourth of the four diagonals each of 7×1 sub-elements of the 64-bits in length in which a plurality of operand switches occur after an initial load.

16. The one or more non-transitory computer readable storage media of claim 15, wherein the (iii) reorganizing constitutes a change in the timing and sequencing of performing additions for the 7×1 sub-elements of the 64-bits in length arranged across a plurality of columns without creating a structure of a different shape or organization through a change in timing of performing additions or a change in sequencing of performing additions, or both.

17. The one or more non-transitory computer readable storage media of claim 15:
wherein the asymmetric intermediate result having the seven diagonals therein, each of a different length, requires seven overhead carries within a non-optimized 512-bit squaring algorithm; and
wherein the symmetric intermediate result having the four diagonals each of 7×1 sub-elements of the 64-bits in length arranged across a plurality of columns, requires four overhead carries within an optimized 512-bit squaring algorithm.

18. The one or more non-transitory computer readable storage media of claim 15, wherein multiplying every one of the eight sub-elements by the other remaining seven of the eight sub-elements to yield an asymmetric intermediate result having seven diagonals therein, comprises:
each of the seven diagonals offset by 64-bits such that a first of the seven diagonals is a 7×1 diagonal in length, then a second is a 6×1 diagonal in length, then a third is a 5×1 diagonal in length, then a fourth is a 4×1 diagonal in length, then a fifth is a 3×1 diagonal in length, then a sixth is a 2×1 diagonal in length, and then a seventh is a 1×1 diagonal in length.

19. An integrated circuit, comprising:
a plurality of registers for storing operands;
an input to receive a 512-bit value for squaring, the 512-bit value having eight sub-elements each of 64-bits; and
a 512-bit squaring algorithm implemented as a multiply extension ("mulx") of an Instruction Set Architecture (ISA) instruction, wherein the 512-bit squaring algorithm to operate by:
(i) multiplying every one of the eight sub-elements by itself to yield a square of each of the eight sub-elements, the eight squared sub-elements collectively identified as T1,
(ii) multiplying every one of the eight sub-elements by the other remaining seven of the eight sub-elements to yield an asymmetric intermediate result having seven diagonals therein, wherein each of the seven diagonals are of a different length,
(iii) reorganizing the asymmetric intermediate result having the seven diagonals therein into a symmetric intermediate result having four diagonals each of 7×1 sub-elements of the 64-bits in length arranged across a plurality of columns, wherein fewer load and store operations from the plurality of registers are required after the reorganizing;
(iv) for each of the plurality of columns, adding all sub-elements within the respective one of the plurality of columns, the added sub-elements collectively identified as T2, and
(v) yielding a final 512-bit squared result of the 512-bit value by adding the value of T2 twice with the value of T1 once;
an output to egress the final 512-bit squared result of the 512-bit value; and
wherein the (iv) adding all sub-elements within their respective columns, further includes: (a) adding a first of the four diagonals each of 7×1 sub-elements of the 64-bits in length in which one operand is loaded once and does not switch, (b) adding a second and a third of the four diagonals each of 7×1 sub-elements of the 64-bits in length in which only one operand is switched after an initial load, and (c) adding a fourth of the four diagonals each of 7×1 sub-elements of the 64-bits in length in which a plurality of operand switches occur after an initial load.

20. The integrated circuit of claim 19:
wherein the integrated circuit is embodied within one of a tablet computing device or smartphone; and
wherein the tablet computing device or smartphone further comprises a touch screen interface.

21. The integrated circuit of claim 19, wherein the integrated circuit comprises an Intel Architecture type Central Processing Unit (CPU).

22. The integrated circuit of claim 19, wherein the integrated circuit comprises a 64-bit processor core.

23. The integrated circuit of claim 19:
wherein the asymmetric intermediate result having the seven diagonals therein, each of a different length, requires seven overhead carries within a non-optimized 512-bit squaring algorithm; and
wherein the symmetric intermediate result having the four diagonals each of 7×1 sub-elements of the 64-bits in length arranged across a plurality of columns, requires four overhead carries within an optimized 512-bit squaring algorithm.

24. The integrated circuit of claim 19, wherein multiplying every one of the eight sub-elements by the other remaining seven of the eight sub-elements to yield an asymmetric intermediate result having seven diagonals therein, comprises:

each of the seven diagonals offset by 64-bits such that a first of the seven diagonals is a 7×1 diagonal in length, then a second is a 6×1 diagonal in length, then a third is a 5×1 diagonal in length, then a fourth is a 4×1 diagonal in length, then a fifth is a 3×1 diagonal in length, then a sixth is a 2×1 diagonal in length, and then a seventh is a 1×1 diagonal in length.

25. The integrated circuit of claim 19, wherein the integrated circuit comprises an Intel Architecture type Central Processing Unit (CPU) or alternatively wherein the integrated circuit comprises a 64-bit processor core.

26. A system comprising:
a system bus;
a touch screen interface coupled with the system bus;
a memory coupled with the system bus;
a processor coupled with the system bus; and
a 512-bit squaring algorithm to operate at an integrated circuit of the system, the integrated circuit having a plurality of registers for storing operands, wherein the 512-bit squaring algorithm is to operate in conjunction with the memory and the processor by:
(i) receiving a 512-bit value for squaring, the 512-bit value having eight sub-elements each of 64-bits; and
(ii) multiplying every one of the eight sub-elements by itself to yield a square of each of the eight sub-elements, the eight squared sub-elements collectively identified as T1,
(iii) multiplying every one of the eight sub-elements by the other remaining seven of the eight sub-elements to yield an asymmetric intermediate result having seven diagonals therein, wherein each of the seven diagonals are of a different length,
(iv) reorganizing the asymmetric intermediate result having the seven diagonals therein into a symmetric intermediate result having four diagonals each of 7×1 sub-elements of the 64-bits in length arranged across a plurality of columns, wherein fewer load and store operations from the plurality of registers are required after the reorganizing;
(v) for each of the plurality of columns, adding all sub-elements within the respective one of the plurality of columns, the added sub-elements collectively identified as T2, and
(vi) yielding a final 512-bit squared result of the 512-bit value by adding the value of T2 twice with the value of T1 once; and
wherein the (iv) adding all sub-elements within their respective columns, further includes: (a) adding a first of the four diagonals each of 7×1 sub-elements of the 64-bits in length in which one operand is loaded once and does not switch, (b) adding a second and a third of the four diagonals each of 7×1 sub-elements of the 64-bits in length in which only one operand is switched after an initial load, and (c) adding a fourth of the four diagonals each of 7×1 sub-elements of the 64-bits in length in which a plurality of operand switches occur after an initial load.

27. The system of claim 26:
wherein the system, including the system bus, the memory, the processor, and the 512-bit squaring algorithm, is embodied within one of a tablet computing device or smartphone.

28. The system of claim 26, wherein the processor comprises a 64-bit Intel Architecture type Central Processing Unit Core (CPU).

29. The system of claim 26:
wherein the asymmetric intermediate result having the seven diagonals therein, each of a different length, requires seven overhead carries within a non-optimized 512-bit squaring algorithm; and
wherein the symmetric intermediate result having the four diagonals each of 7×1 sub-elements of the 64-bits in length arranged across a plurality of columns, requires four overhead carries within an optimized 512-bit squaring algorithm.

30. The system of claim 26, wherein the integrated circuit comprises an Intel Architecture type Central Processing Unit (CPU) or alternatively wherein the integrated circuit comprises a 64-bit processor core.

* * * * *